FIG. 8A

| SWITCH | POINT ACTIVATED | | | | | | | | | | | |
|---|---|---|---|---|---|---|---|---|---|---|---|---|
| | A1 | A2 | A3 | A4 | B1 | B2 | B3 | B4 | C1 | C2 | C3 | C4 |
| 1 | × | | | | × | | | | × | | | |
| 2 | × | | | | × | | | | | × | | |
| 3 | × | | | | × | | | | | | × | |
| 4 | × | | | | × | | | | | | | × |
| 5 | × | | | | | × | | | × | | | |
| 6 | × | | | | | × | | | | × | | |
| 7 | × | | | | | × | | | | | × | |
| 8 | × | | | | | × | | | | | | × |
| 9 | × | | | | | | × | | × | | | |
| 10 | × | | | | | | × | | | × | | |
| 11 | × | | | | | | × | | | | × | |
| 12 | × | | | | | | × | | | | | × |
| 13 | × | | | | | | | × | × | | | |
| 14 | × | | | | | | | × | | × | | |
| 15 | × | | | | | | | × | | | × | |
| 16 | × | | | | | | | × | | | | × |
| 17 | | × | | | × | | | | × | | | |
| 18 | | × | | | × | | | | | × | | |
| 19 | | × | | | × | | | | | | × | |
| 20 | | × | | | × | | | | | | | × |
| 21 | | × | | | | × | | | × | | | |
| 22 | | × | | | | × | | | | × | | |
| 23 | | × | | | | × | | | | | × | |
| 24 | | × | | | | × | | | | | | × |
| 25 | | × | | | | | × | | × | | | |
| 26 | | × | | | | | × | | | × | | |
| 27 | | × | | | | | × | | | | × | |
| 28 | | × | | | | | × | | | | | × |
| 29 | | × | | | | | | × | × | | | |
| 30 | | × | | | | | | × | | × | | |
| 31 | | × | | | | | | × | | | × | |
| 32 | | × | | | | | | × | | | | × |

FIG. 8B

| FIG. 8A |
|---------|
| FIG. 8B |

FIG. 8

United States Patent Office 3,541,547
Patented Nov. 17, 1970

3,541,547
CODE CONVERTER
Paul Abramson, Yorktown Heights, and Hans Y. Juliusburger, Putnam Valley, N.Y., assignors to International Business Machines Corporation, Armonk, N.Y., a corporation of New York
Filed Mar. 15, 1968, Ser. No. 713,528
Int. Cl. H03k 13/25
U.S. Cl. 340—347                                4 Claims

ABSTRACT OF THE DISCLOSURE

A code converter for converting a 1 out of $N^3$ code to a 3 out of 3N code which comprises two sets of OR circuits, a connecting matrix, N transistor circuits and a $N^2 \times N$ switching matrix.

CROSS REFERENCE TO RELATED APPLICATIONS

"Oscillator Apparatus for Generating Tone Frequencies," inventor, P. Abramson, Ser. No. 604,244, filed Dec. 23, 1966, now Pat. No. 3,427,569.

BACKGROUND OF THE INVENTION

Field of the invention

The field of the invention involves subject matter relating to communications by means which are in part or in whole electrical. More specifically, the field of the invention relates to subject matter for translating one code into another.

Prior art

This invention relates to conversion systems and more particularly to a code converter for converting 1 out of $N^3$ code to a 3 out of 3N code. In the past, code converters designed to perform the same function included a multiplicity of elements and had the problem of maintaining proper isolation between distinct paths within the code converter to perform the proper code conversion.

Therefore, an object of the present invention is to provide a code converter employing a substantially reduced number of components to obtain the same results as provided for by the prior art.

A further object of the invention is to provide a code converter wherein proper isolation is obtained between all discrete paths within the code converter allowing proper code conversion.

SUMMARY OF THE INVENTION

Briefly, the invention addresses itself to the problem of translating a 1 out of $N^3$ code to a 3 out of 3N code. The code converter consists of three sets of electronic circuits, each set of electronic circuits providing N discrete outputs. Two sets of the electronic circuits are interconnected via a connection matrix such that one output in said second set of electronic circuits will be activated whenever an output is activated from said first set of electronic circuits. There being N discrete outputs in each set of electronic circuits in question, there will be $N^2$ discrete sets of outputs from the two sets of electronic circuits. A switching matrix is provided for connecting the third set of electronic circuits to the first and second set of electronic circuits in such a manner that when any given switch position within the switching matrix is depressed, a unique path between the three sets of electronic circuits will be established such that a unique combination of an output from said first set, an output from said second set and an output from said third set of electronic circuits will be established.

BRIEF DESCRIPTION OF THE DRAWINGS

The foregoing and other objects, features and advantages of the invention will be apparent from the foregoing more particular description of the preferred embodiments of the invention, as illustrated in the accompanying drawings.

In the drawings:

FIGS. 8A and 8B are a table showing what points in each of the three sets of points will be activated as a given switch position, within the switching matrix, is activated in both embodiments of the invention.

DESCRIPTION OF THE PREFERRED EMBODIMENTS

To provide a clear description of the invention and its operations, the invention will be described by means of two preferred embodiments. To further simplify the discussion of the two embodiments, and for purposes of illustration, the variable N will be allowed to equal 4. The further discussion will therefore be directed to a code converter for converting a 1 out of 64 code to a 3 out of 12 code. It should be understood that it is not the intent to limit the scope of the invention by using as examples these two specific embodiments having N equal 4.

DESCRIPTION OF EMBODIMENT 1

Figure 1:
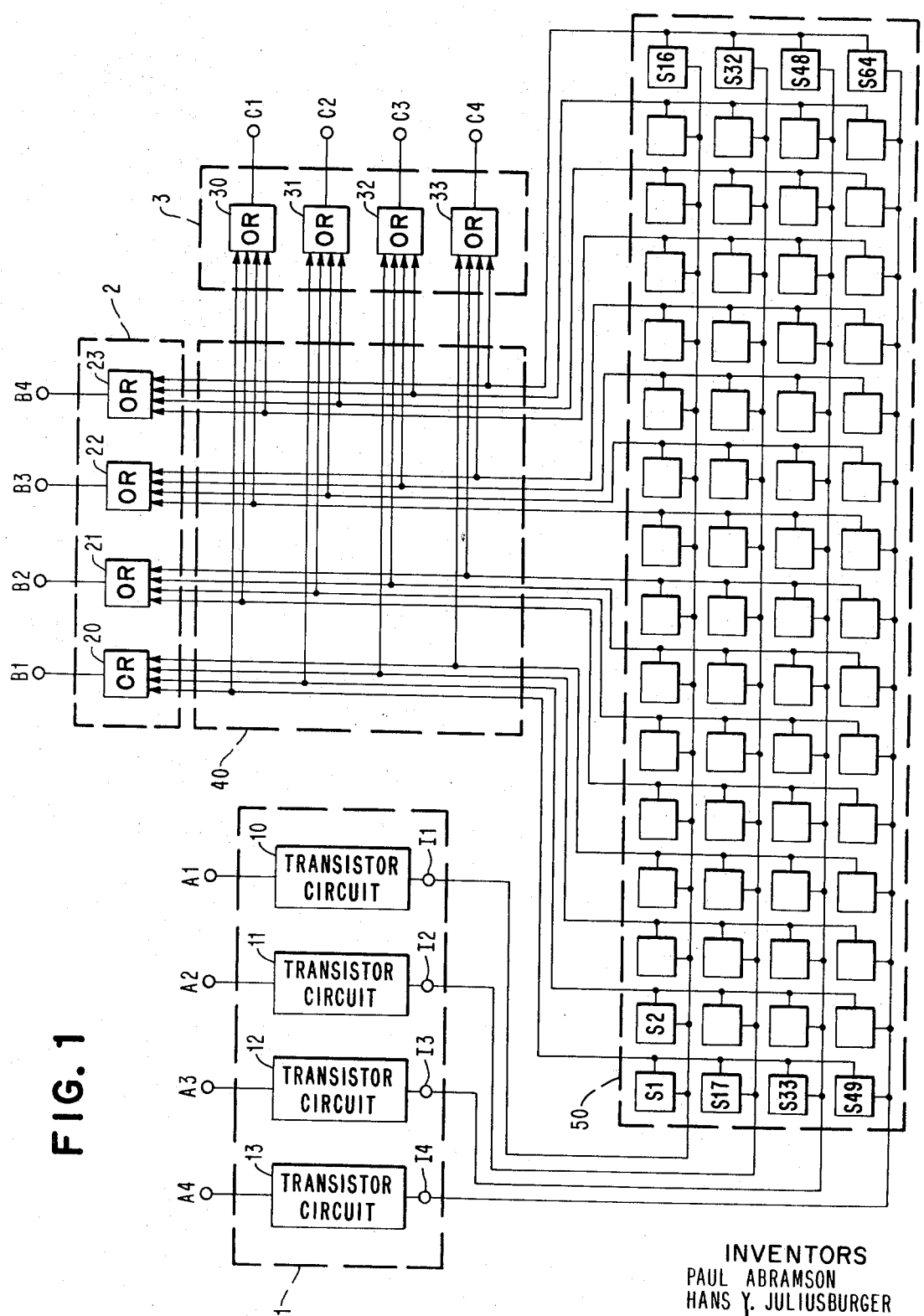
FIG. 1 shows a logic diagram of the code converter.

In reference to FIG. 1, the first embodiment of this invention comprises a set of 1 of transistor circuits 10, 11, 12 and 13 having respective outputs of A–1, A–2, A–3, and A–4 and having associated inputs I–1, I–2, I–3, and I–4, a first set 2 of four OR circuits 20, 21, 22 and 23 having associated outputs B–1, B–2, B–3, and B–4, and a second set 3 of four OR circuits 30, 31, 32, and 33 having associated outputs C–1, C–2, C–3, and C–4. Each of the OR circuits has four inputs.

A connection matrix 40 connects each OR circuit 20, 21, 22 and 23 in the first set 2 of OR circuits to each OR circuit 30, 31, 32 and 33 in the second set 3 of OR circuits. It can be seen from FIG. 1 that OR circuit 20 has each of its four input legs connected to one of the OR circuits 30, 31, 32 or 33 in the second set 3 of OR circuits. This process is followed for OR circuits 21, 22 and 23 in said first set 2 of OR circuits. In this manner the first set 2 of four OR circuits 20, 21, 22 and 23 are interrelated with the second set 3 of OR circuits 30, 31, 32 and 33 to provide 16 distinct sets of outputs. The 16 distinct sets of outputs are defined by all the possible distinct combinations of the four outputs associated with each of the two sets 2 and 3 of OR circuits.

The first set 2 of OR circuits 20, 21, 22 and 23 has a total of 16 inputs, that is four inputs to each of four OR circuits. The 16 inputs to the first set 2 of OR circuits 20, 21 22 and 23 is connected to a switching matrix 50.

Switching matrix 50 is comprised of 64 switches, each switch having at least one set of normally open contacts associated with it. Only one set of normally open contacts associated with each switch will be used in the switching matrix. The switch may take the form of a toggle switch, a pressure switch, a set of contacts on a relay operated by some remote means, etc. Each of the 16 inputs from the first set 2 of OR circuits is connected to four switches within the switching matrix 50. No switch within the switching matrix 50 is connected to more than one of the input arms from the first set 2 of OR circuits. This is exemplified by OR circuit 20 of the first set 2 of OR circuits having one input arm connected to switches S–1, S–17, S–33, and S–49 of switching matrix 50.

The other contact of each of the switches within the switching matrix 50 is connected to one of the inputs of the transistor circuits 10, 11, 12 and 13. Input I–1 of transistor 10 is connected to one contact of switches S–1 and S–16, input I–2 of transistor circuit 11 is connected to switches S–17 through S–32, input I–3 of transistor circuit 12 is connected to switches S–33 through S–48 and input I–4 of transistor circuit 13 is connected to switches S–49 through S–64.

Figure 2:
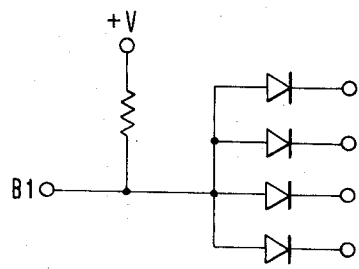
FIG. 2 is the circuit diagram of the OR circuit as used in the first embodiment of the invention.

FIG. 2 shows the circuit diagram for the OR circuit as used in OR circuits 20, 21, 22, 23, 30, 31, 32, and 33. When the cathodes of the four diodes associated with this OR circuit are open the output as designated as B–1 will be equal to +V. When the cathode of any of the four diodes are connected to a voltage lower than +V, the value of the voltage at point B–1 will be equal to the value of the voltage connected to the cathode of the diode in question.

Figure 3:
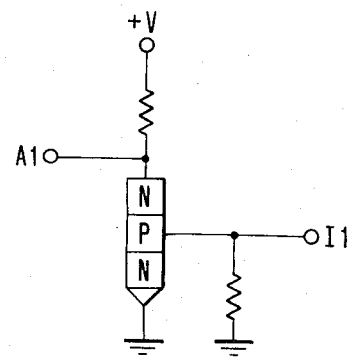
FIG. 3 is the circuit configuration of the transistor circuit as used in the first embodiment.

FIG. 3 shows a transistor circuit as employed within embodiment 1 of this invention. The circuit comprises a NPN transistor having a grounded emitter, a bias resistor from base to ground, and a collector resistor going to a positive voltage supply. The output of the circuit is taken from the collector of the NPN transistor. This circuit is so biased that the transistor is normally turned off when point I–1 is open or floating.

OPERATION OF EMBODIMENT 1

Figure 4:
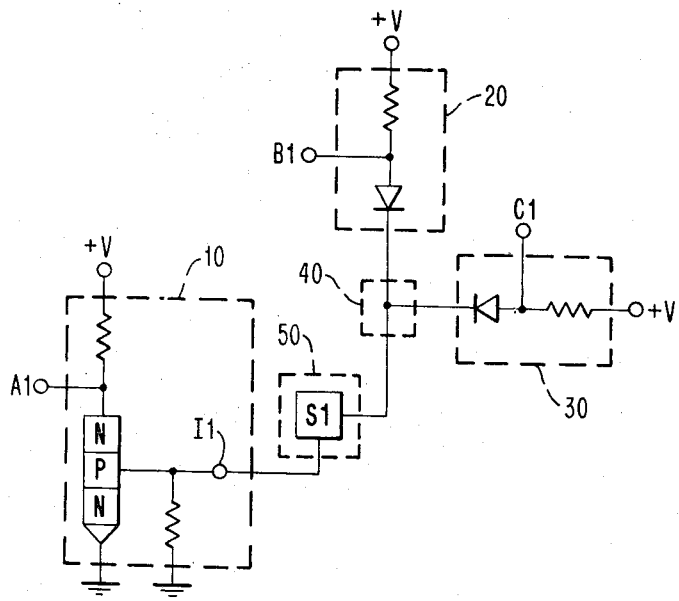
FIG. 4 is the equivalent circuit diagram associated with each switch position within the switching matrix as found in the first embodiment of the invention.

FIG. 4 shows the circuitry associated with switch 1 within switching matrix 50. In order to simplify the discussion as to how the invention operates when a switch within switching matrix 50 is closed, the discussion will be made as to switch position S–1 only. As can be seen from FIG. 4, the transistor circuit 10 as shown in the circuit configuration presented in FIG. 3 is connected via input point I–1 to switch S–1 of switching matrix 50. The other contact within switch S–1 of switching matrix 50 is connected to a pair of inputs, one input associated with an OR circuit 20 of the first set 2 of OR circuits and the second input associated with OR circuit 30 of the second set 3 of OR circuits via connection matrix 40.

When switch S–1 is open, point A–1 is equal to +V since the transistor in the transistor circuit 10 is turned off, output points B–1 and C–1 are both equal to +V since the cathode of the respective diodes of OR circuit 20 and OR circuit 30 are floating. When switch S–1 is closed the cathode of the diodes in OR circuit 20 and OR circuit 30 are connected via connection matrix 40 through switch S–1 through the base emitter junction of the transistor in transistor circuit 10 to ground. This current path will allow current to flow and cause output points B–1 of OR circuit 20 and C–1 of OR circuit 30 to appear approximately at ground. The base of the transistor within transistor circuit 10 will now also appear at ground level and will cause the transistor within transistor circuit 10 to conduct. When the transistor within transistor circuit 10 conducts, the bias resistors are so set that point A–1 will be approximately at ground level.

Figures 8, 8A, 8B:
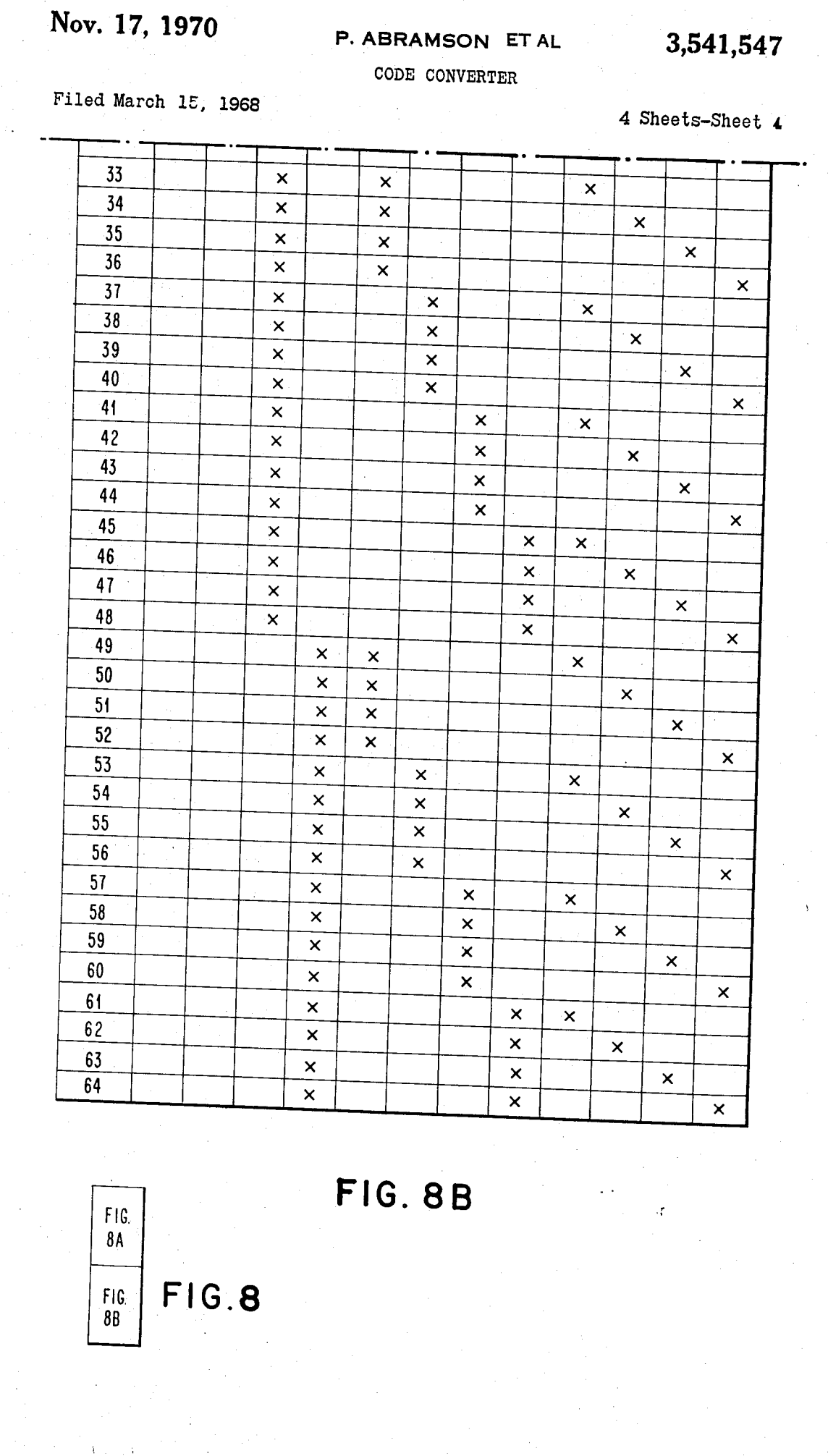

It therefore can be seen that by closing switch S–1 points A–1, B–1 and C–1 change their value from a +V to a ground potential. In a similar manner, each of the switches within switching matrix 50 will complete a path substantially the same as that shown in FIG. 4. FIG. 8 shows the output points that will be activated with the closing of each of the 64 switches within switching matrix 50. It therefore can be seen that a code conversion of 1 out of 64 to 3 out of 12 has been accomplished via this code converter. It can be further seen that a minimum number of parts were used, that is 8 or circuits, 4 transistor circuits, a relatively simple connection matrix and a switching matrix.

DESCRIPTION OF EMBODIMENT 2

Embodiment 2 of the invention has the same system configuration as set forth in embodiment 1. The major difference between the two embodiments is (1) the type of OR circuit used and (2) the type of transistor circuit used.

Figure 5:
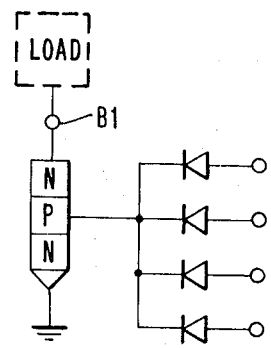
FIG. 5 is the circuit diagram for the OR circuit as found in the second embodiment of the invention.

FIG. 5 shows the circuit configuration of the OR circuit used in embodiment 2. When all the anodes of the four diodes connected to the base of the transistor are open the transistor as shown in FIG. 5 is turned off and the point B–1 appears to be floating. The load connected to point B–1 is not part of the OR circuit but does provide a closed path to some proper voltage. When any of the anodes of the four diodes connected to the base of the transistor are connected to a proper voltage, the transistor will conduct and point B–1 will assume approximately a ground potential.

Figure 6:
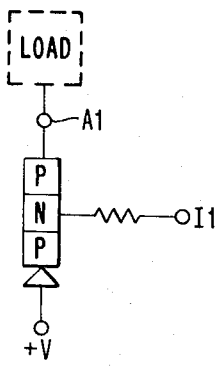
FIG. 6 is the circuit diagram for the transistor circuit as found within the second embodiment of the invention.

FIG. 6 shows the transistor circuit that is used in the second embodiment. The transistor circuit is comprised of a PNP transistor having a collector connected to some positive voltage, a resistor in series with the input to the base of the transistor and again a load that is not part of the transistor circuit in question but one that does provide a closed path to some proper voltage supply. When there is no input to point I–1 of the transistor circuit, the transistor is turned off and point A–1 of the transistor circuit appears to be floating. When there is a proper input to point I–1 of the transistor circuit, the transistor will conduct and point A–1 will assume approximately the positive voltage applied to the emitter of the transistor of the transistor circuit.

The load referred to in both the OR circuit and the transistor circuit in the second embodiment may be an oscillator circuit as shown in P. Abramson's copending application, "Oscillator Apparatus for Generating Tone Frequency," Ser. No. 604,244, filed Dec. 23, 1966, now Pat. No. 3,427,569.

OPERATION OF EMBODIMENT 2

Figure 7:
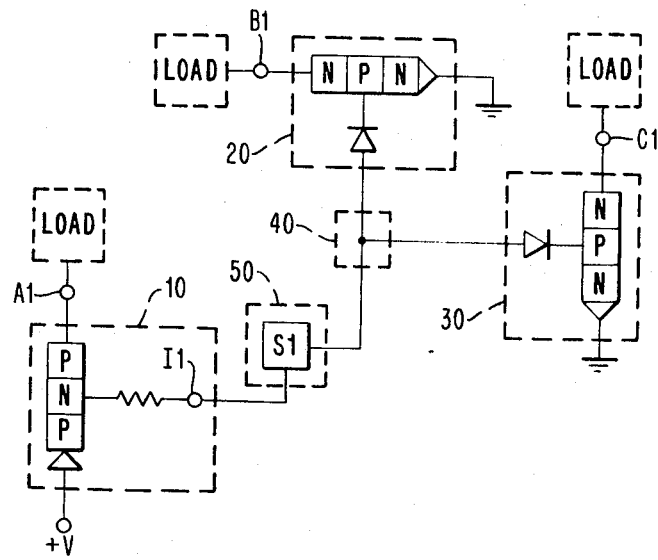
FIG. 7 is the equivalent circuit configuration associated with each given switch position within the switching matrix as found within the second embodiment of the invention.

In a similar manner as the operation for embodiment 1 was presented, operation of embodiment 2 will be presented with reference to the circuit configuration associated with switch S–1 of the switching matrix 50. FIG. 7 shows the associated circuits connected to switch S–1 of switching matrix 50. It can be readily realized that the OR circuits are of the type shown in FIG. 5, and the transistor circuit is that of the type shown in FIG. 6. When switch S–1 of switching matrix 50 is open, the input I–1 of transistor circuit 10 is floating which causes the output A–1 of transistor circuit 10 to also be floating since the transistor is nonconducting. When the switch S–1 of switching matrix 50 opens, the anode of the diode associated with OR circuits 20 and 30 are floating and therefore the transistors associated with the OR circuits 20 and 30 are nonconducting allowing their respective output points B–1 and C–1 to appear to be also floating. When switch S–1 is closed, current will flow from ground through the base emitter junction of the transistors in OR circuits 20 and 30, respectively, through the input legs of OR circuits 20 and 30 respectively, via connection matrix 40, through switch S–1 of switching matrix 50, through the input resistor in series with the input I–1 of the transistor circuit 10, through the base emitter junction of the transistor in transistor circuit 10 to the positive voltage. All the voltage appears to be dropped across the input resistor in series with the input to the base of the transistor in transistor circuit 10. Also, it should be noted that the current flow through the emitter base junctions of all three transistors are of such magnitude as to drive the three transistors into saturation. Under these conditions the outputs B–1 and C–1 of respective OR circuits 20 and 30 will appear to be at ground potential and the base and output point A–1 of transistor circuit 10 will appear to be at the positive voltage connected to the emitter of the transistor of transistor circuit 10.

It can therefore be realized that by closing the switch S–1 points A–1, B–1 and C–1 which were initially floating have now been changed to A–1 having some positive voltage, B–1 and C–1 being at ground potential. In a similar manner, each of the 64 switches within the switching matrix 50 will select one of the transistor circuits 10, 11, 12 and 13 and one of the OR circuits 20, 21, 22 and 23 from the first set 2 of OR circuits and one of the OR circuits 30, 31, 32 and 33 from the second set 3 of OR circuits to become activated when each of the switches 20 are closed. With reference to FIG. 8, it can be seen what output points will be activated when each of the 64 switches and switching matrix 50 are closed.

It should be noted that the advantages of this embodiment are again the use of only 8 OR circuits and 4 transistor circuits, a relatively simple connection matrix and a switching matrix. An added advantage to the second embodiment is that it allows not only for complete isolation of individual paths throughout the code converter to allow proper code conversion but also does not provide a loading factor of any significant value to the load. This is specifically utilized when the load takes on the characteristic of an oscillator wherein any loading will cause frequency shift of the frequency of operation of the oscillator which is detrimental to the purpose for which the oscillator is being used.

While the invention has been particularly shown and described with reference to preferred embodiments thereof, it will be understood by those skilled in the art that various changes in form and detail may be made therein without departing from the spirit and scope of the invention.

What is claimed is:

1. A code convertor for converting a 1 out of $N^3$ to a 3 out of 3N code comprising:
  a first set of N OR circuits each having N inputs;
  a second set of N OR circuits each having N inputs;
  a connection matrix for connecting each OR circuit in said first set to each OR circuit in said second set;
  N transistor circuits;
  a $N^2 \times N$ switching matrix comprising $N^3$ switches for connecting each input of all OR circuits in said first set to each of said N transistor circuits, each said switch being connected to a unique combination comprising an OR circuit in said first set, an OR circuit in said second set and one of said transistor circuits whereby selective input closing of said switches accomplishes code conversion of 1 out of $N^3$ code to a 3 out of 3N code output of said circuits.

2. A code converter as set forth in claim 1 wherein:
  said OR circuits are comprised of N diodes having a common anode connection, a resistor connected to said common anode connection, the output being taken from said common anode connection; and where
  said transistor circuits are comprised of an NPN transistor, having a base, emitter and collector, said NPN transistor having said emitter grounded, a resistor connected from said base to ground, the input being connected to said base and the output being taken from said collector.

3. A code converter as set forth in claim 1 wherein:
  said OR circuits are comprised of N diodes having a common cathode connection, a NPN transistor having a base, an emitter and collector, said common cathode connection being conected to said base, said emitter being grounded, the output being taken from said collector; and wherein
  said transistor circuits are comprised of a PNP transistor, an input resistor being connected in series with said base, said emitter being connected to a positive voltage, the output being taken from said collector.

4. A code converter for converting a 1 out of $N^3$ code to a 3 out of 3N code comprising:
  a first set of N OR circuits, each having N inputs;
  a second set of N OR circuits, each having N inputs;
  a connection matrix for connecting each OR circuit in said first set to each OR circuit in said second set;
  N signal switching means;
  a $N^2 \times N$ switching matrix comprising $N^3$ switches for connecting each input of all OR circuits in said first set to each of said N signal switching means, each said switch being connected to a unique combination comprising an OR circuit in said first set, an OR circuit in said second set and one of said signal switching means whereby selective input closing of said switches accomplishes code conversion of 1 out of $N^3$ code to a 3 out of 3N code output of said circuits.

References Cited

UNITED STATES PATENTS

| | | | |
|---|---|---|---|
| 3,340,524 | 9/1967 | Rinaldi | 340—166 X |
| 3,358,269 | 12/1967 | Benes | 340—166 |
| 3,465,292 | 9/1969 | Schilling et al. | 340—347 |

MAYNARD R. WILBUR, Primary Examiner

M. K. WOLENSKY, Assistant Examiner

U.S. Cl. X.R.

340—166

UNITED STATES PATENT OFFICE
CERTIFICATE OF CORRECTION

Patent No. 3,541,547          Dated November 17, 1970

Inventor(s) Paul Abramson et al.

It is certified that error appears in the above-identified patent and that said Letters Patent are hereby corrected as shown below:

Column 5, line 45, after "$N^3$" insert -- code --.

Signed and sealed this 20th day of April 1971.

(SEAL)
Attest:

EDWARD M. FLETCHER, JR.
Attesting Officer

WILLIAM E. SCHUYLER, JR
Commissioner of Patents